United States Patent [19]

Sugalski et al.

[11] 4,373,129
[45] Feb. 8, 1983

[54] APPARATUS FOR ASSEMBLING AND WELDING VENTED CELL COVERS

[75] Inventors: Raymond K. Sugalski; Kenneth C. Leduc, both of Gainesville; Jesse L. Morris, Archer, all of Fla.

[73] Assignee: General Electric Company, Gainesville, Fla.

[21] Appl. No.: 173,868

[22] Filed: Jul. 30, 1980

Related U.S. Application Data

[63] Continuation of Ser. No. 921,208, Jul. 3, 1978.

[51] Int. Cl.³ .................. B23K 11/32; B23P 21/00
[52] U.S. Cl. ..................................... 219/79; 219/153; 29/785; 29/792
[58] Field of Search .............. 219/79, 80, 159, 153; 29/785, 730, 731, 783, 792; 429/54, 56; 72/135

[56] References Cited

U.S. PATENT DOCUMENTS

| | | | |
|---|---|---|---|
| 2,746,512 | 5/1956 | Hampson | 72/135 |
| 2,790,570 | 4/1957 | Hodges et al. | 429/54 |
| 3,015,155 | 1/1962 | Dobson et al. | 29/783 X |
| 3,317,702 | 5/1967 | Mann | 219/79 |
| 3,321,606 | 5/1967 | Cropp et al. | 219/79 |
| 3,679,861 | 7/1972 | La Valle | 219/80 X |
| 3,878,355 | 4/1975 | Andrew et al. | 219/79 |
| 3,891,823 | 6/1975 | Dulude et al. | 219/153 X |
| 3,935,413 | 1/1976 | Lesko et al. | 219/159 X |
| 4,163,142 | 7/1979 | Descovich et al. | 219/79 |

FOREIGN PATENT DOCUMENTS

| | | | |
|---|---|---|---|
| 45-14217 | 5/1970 | Japan | 429/54 |
| 435915 | 2/1975 | U.S.S.R. | 29/792 |

*Primary Examiner*—G. Z. Rubinson
*Assistant Examiner*—Keith E. George
*Attorney, Agent, or Firm*—Morgan, Finnegan, Pine, Foley & Lee

[57] ABSTRACT

An apparatus for assembling the component parts of a cover for an electrochemical cell into a cover assembly and for welding the assembly, the apparatus including a carousel having a plurality of equally spaced receptacles, an equal number of equally spaced stations around the carousel, a drive for intermittently turning the carousel to advance the receptacles to each of the stations and holding the receptacle in the station, a feeder at selected stations for feeding a part of the component parts to the carousel, inspection apparatus at stations intermediate the selected stations for inspecting the part assembly in the receptacle, a welder at a station following the selected and inspection stations for welding the assembled cover in the receptacle and an extractor at a station following the welding station for removing the assembled and welded cover from the receptacle.

5 Claims, 26 Drawing Figures

U.S. Patent Feb. 8, 1983 Sheet 1 of 13 4,373,129
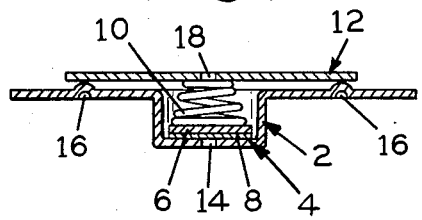
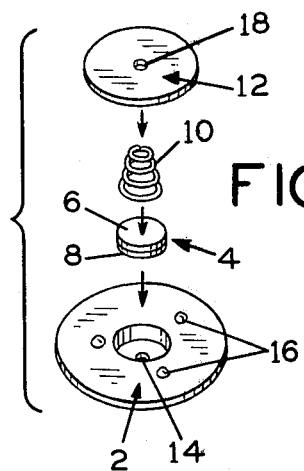
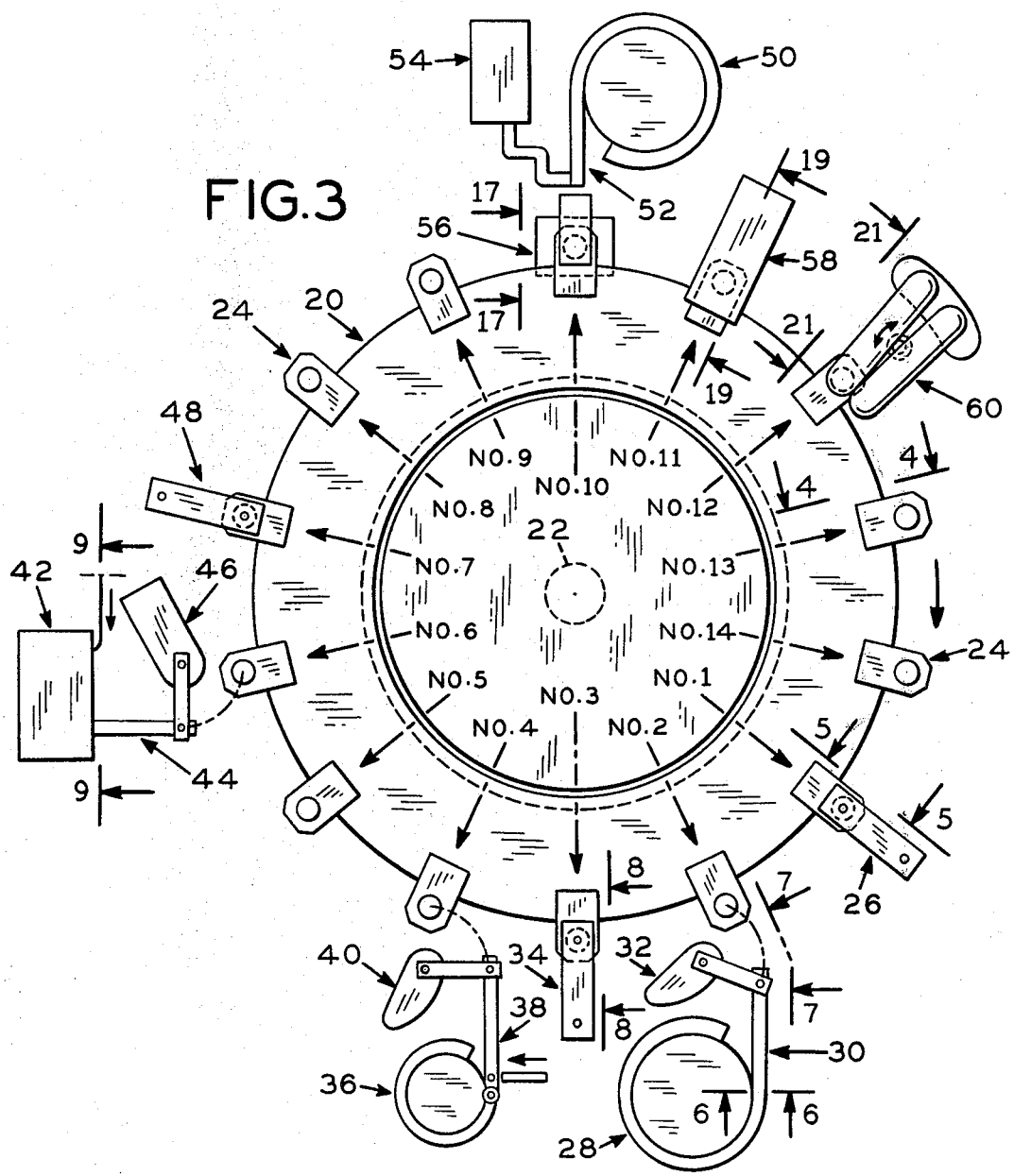

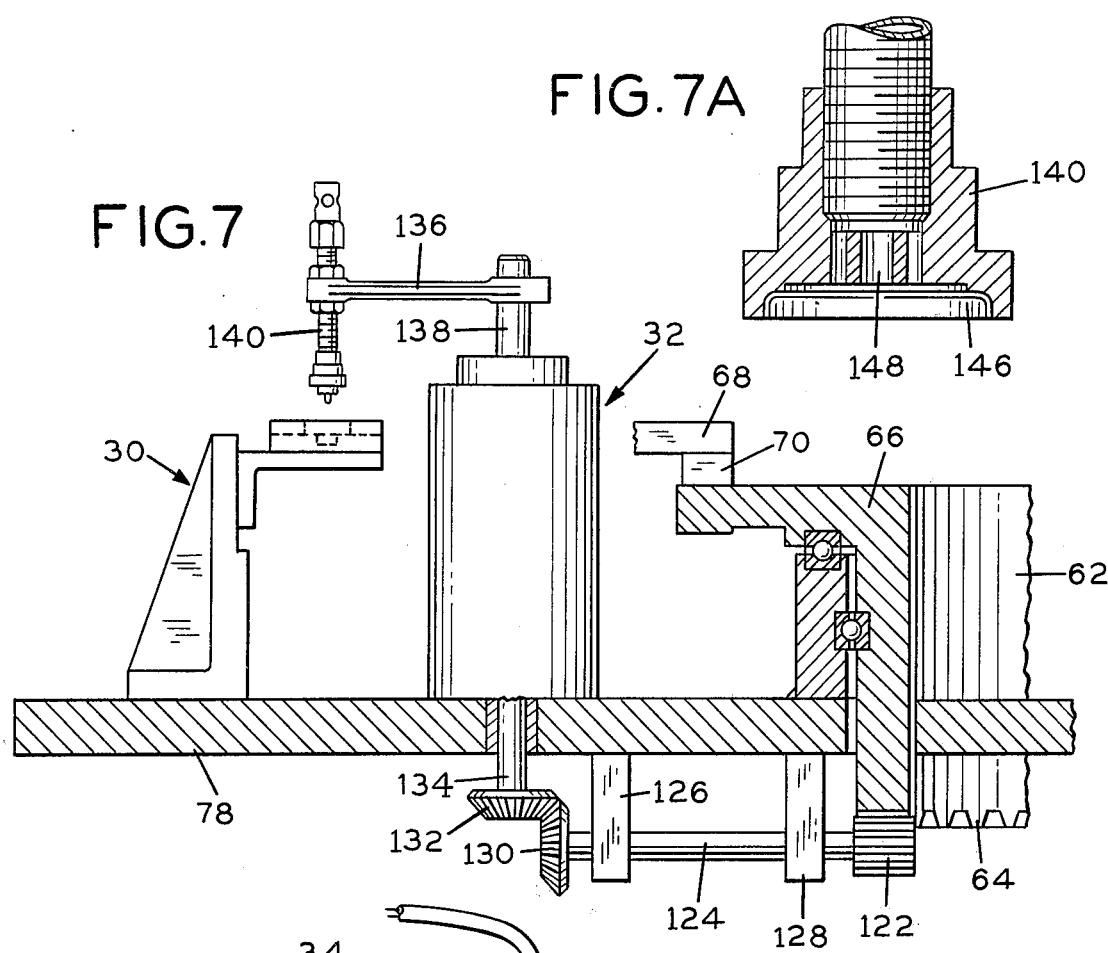
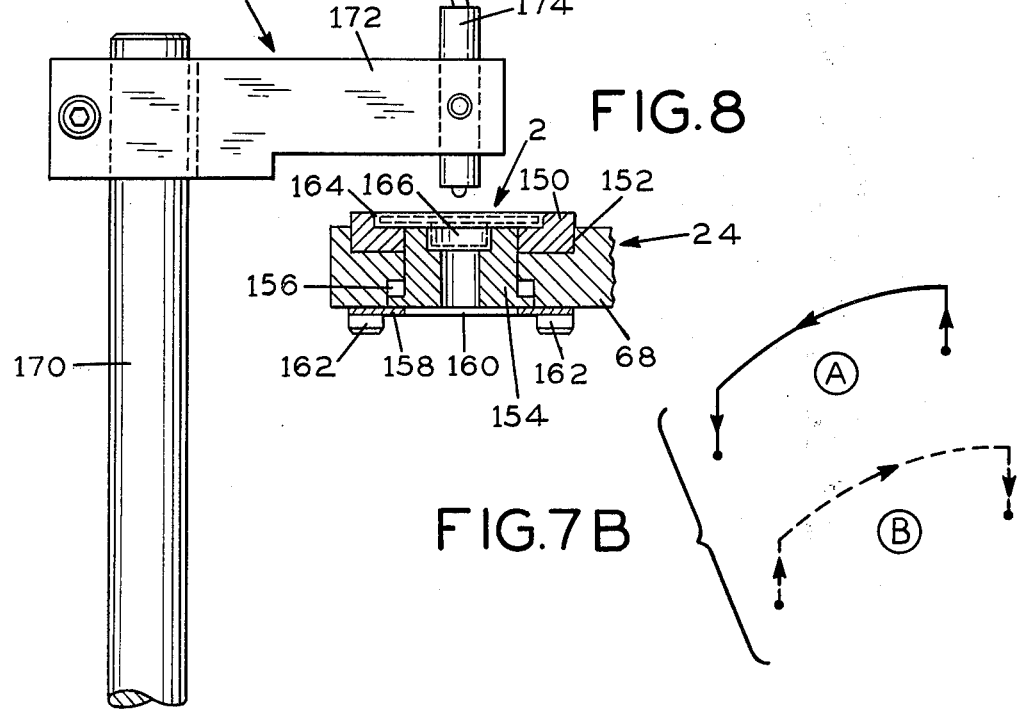

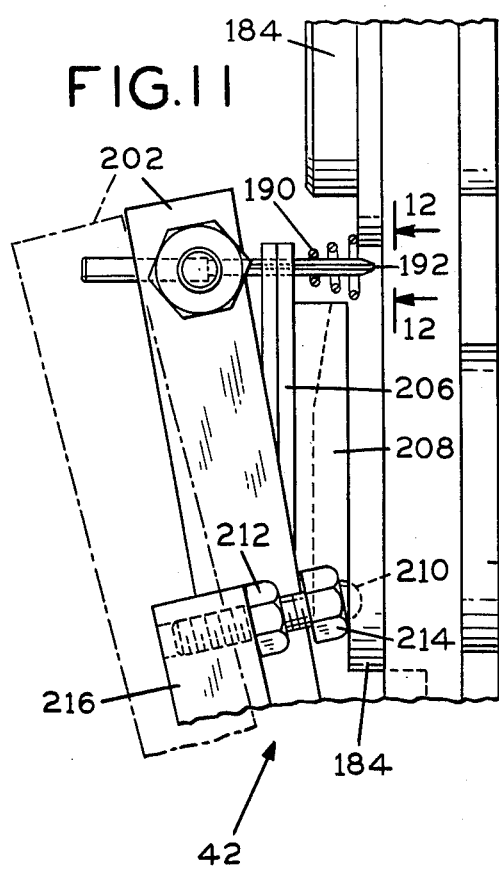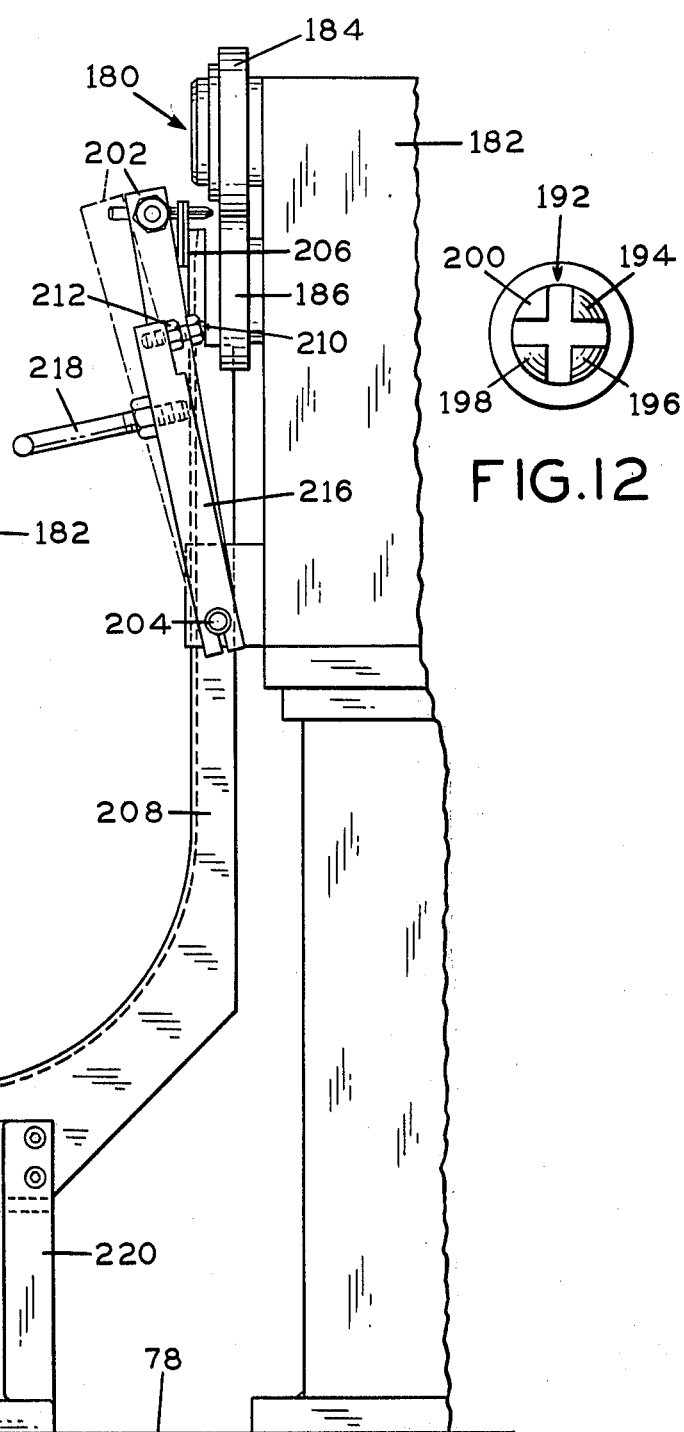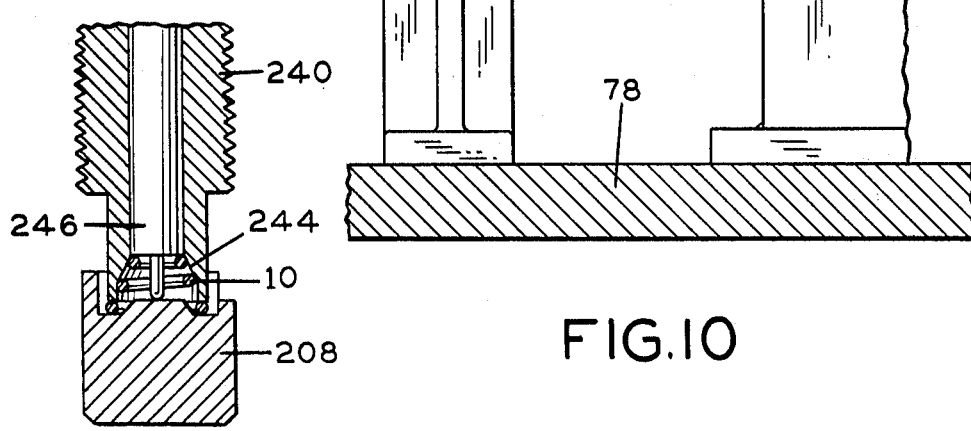

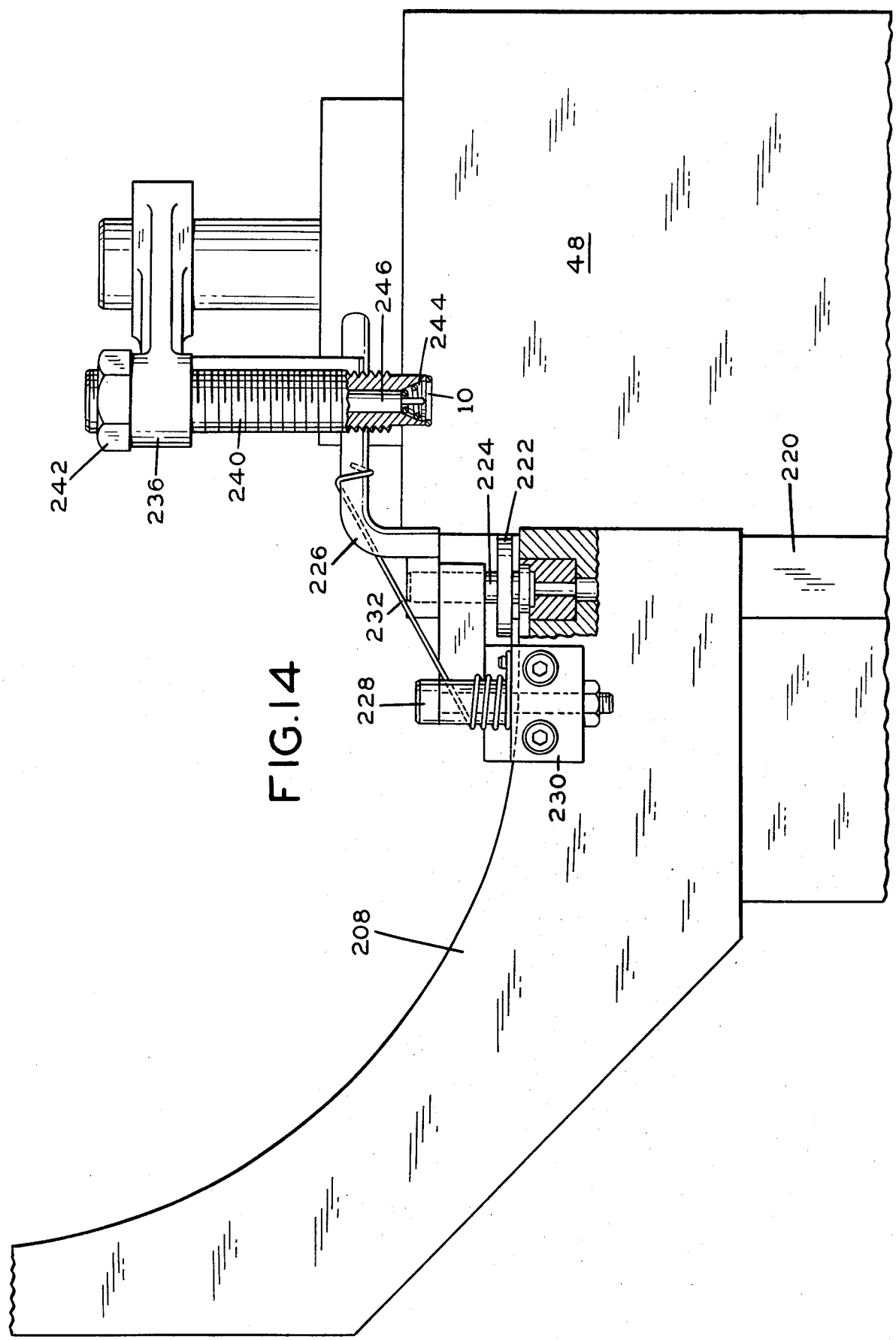

APPARATUS FOR ASSEMBLING AND WELDING VENTED CELL COVERS

This is a continuation, of application Ser. No. 921,208 filed July 3, 1978.

This invention relates to apparatus for assembling covers for galvanic cells and, more particularly, to apparatus for assembling and welding into a composite unit the component parts of a vented cover for electrochemical cells.

In the manufacture of electrolytic cells or batteries to which this invention particularly relates, the positive and the negative plate materials are formed into strips, cut into cell strip lengths and, with separator material between the plates, are wound into a coil. The wound coil is then inserted into a preformed cylindrical container through the open end of the container. The container, or can, as it is sometimes called, is formed with one end closed and its opposite end open. The wound coil is inserted through the open end. After the coil is inserted, electrolyte is added to the container and a cap or cover is placed over the coil end at the open end of the container. The container walls around the cap or cover are then compressed or crimped around the cap or cover edges and, with the cap or cover, form a liquid tight and gas tight closure over the wound coil and electrolyte in the cell.

The cell cap or cover may be of a variety of forms and consists of an electrically conductive center, which is connected to the positive plate and forms the positive terminal of the cell and dielectric or electrical insulating material which surrounds the conductive center and forms a non-conductive, electrical insulating seal between the center and cell wall.

The assembling and welding apparatus of the present invention is concerned with the assembly and welding of electrically conductive center for a cell cap or cell cover, having a high-pressure vent which seals the cell during normal operation but which, upon gas pressures within the cell reaching a predetermined pressure, for example 150 to 300 psig, opens to release the pressure and recloses after such pressure is reduced to the predetermined level. Thus, such high-pressure vented cell prevents explosion, damage and possible safety hazard and, at the same time, prevents the cell from drying out as would be the case if the cell were continuously vented.

While the use of high-pressure vents afford protection for the cell, the equipment in which the cell is used and the personnel involved, the design and fabrication of such units, which is basically a valve, has resulted in problems especially in the automatic or semi-automatic assembly thereof. Such assembly problems have, for the most part, resulted from the use of a conically coiled spring in the unit which have been found to be most desirable and dependable from the standpoint of consistency, dependability, reliability, and the like, but most difficult to assemble with automatic or semi-automatic apparatus. Such springs, when brought together, tend to intertwine and tangle making the feed of such springs and the storage thereof difficult if not impossible. Often times, such springs become so intertwined and tangled that it becomes necessary to scrap large supplies or to hand separate the springs, one from the other. This consumes considerable time and is expensive. Attempts to substitute other elements, such as elastic rings for such conical springs, although overcoming the tangling problem, produce vents which are less reliable and dependable.

Because of the difficulties heretofore encountered in the storage, handling and feeding of conical springs in the assembly of high pressure vent units for wound coil electrolytic cells, it has been the practice to assemble and weld such units by hand. In order that such assembly might be carried out, the conical springs to be assembled into the units are separated, one from the other, in compartmentalized trays. Such springs are then removed, individually from the tray, assembled into the unit with the other components and the components are then welded into the vent unit. This hand sorting and separating of the conical springs, and hand assembling and welding of the vent units adds to the costs of the cells.

In the instant invention, the problems heretofore experienced in the hand sorting and separating of vent unit components and the assembling and welding of such units are overcome by apparatus which sorts and feeds the components and forms and places the conical spring in a prearranged and pre-programmed manner. At various stages in the assembly, the unit then assembled is inspected and on the basis of such inspection, the apparatus is programmed to finish or to reject the unit. There is a final inspection of the finished unit in which such unit is accepted or rejected.

The components to be assembled in the apparatus of the instant invention, except for the spring, are supplied in loose bulk to the hoppers of vibratory-centrifugal feeds where, in a manner which will be described, the particular components are oriented so as to face in assembly direction and are then fed, one after the other, to a pick and place unit. The components, one after the other and in the assembly order are transferred to an assembly carousel moved, in stepped and timed sequence, past each of the component feed stations. Intermediate such stations and at appropriate intervals, first the carousel receptacle and then the partially assembled unit in the receptacle is inspected. As the result of such inspection, the subsequent steps of feed and assembly are programmed to complete or to skip the inspected unit. There is a final inspection where the unit, before discharge from the carousel, is accepted or rejected.

In the apparatus of the present invention, the spring wire to be coiled into conical springs is fed from a supply reel to the spring forming unit where the conical spring is wound and the wound coil is severed from the reel supply. The formed spring coil is individually fed, immediately after it is formed and severed from the reel supply, into a chute which, at its discharge end, is at the carousel. Each spring is maintained separate and apart from the other formed springs and inter-twining and tangling of the springs is avoided. Thus, as the components are being assembled and the conical spring is required, the spring can be removed from the end of the spring chute and placed in the assembly.

The present invention will be more fully described and will be better understood from the following description of the preferred embodiment taken with the appended drawings in which FIG. 1 is a sectional view, in elevation, of a vented cover assembly to which the apparatus of the illustrated embodiment of the instant invention is especially adapted;

FIG. 2 is an exploded view, in perspective, of the cover assembly of FIG. 1;

FIG. 3 is a top plan view, partly in diagram, of the apparatus of the present invention for assembling the covers of FIGS. 1 and 2;

FIG. 7 is an enlarged view, in elevation and partly in section, taken at 7—7 FIG. 3 and showing the pick-and-place transfer unit;

FIG. 7A is an enlarged view, in section, of the transfer head of the unit of FIG. 7;

FIG. 7B is a diagrammical illustration of the transfer head movement of the unit of FIG. 7;

FIG. 8 is an enlarged view, partly in section, taken at 8—8 FIG. 3 and showing the intermediate inspection apparatus;

FIG. 10 is a side view of the coiling apparatus taken at 10—10 FIG. 9;

FIG. 11 is an enlarged view of the upper end of the coiling apparatus of FIG. 10;

FIG. 12 is an enlarged view, taken at 12—12 FIG. 11, showing the coil spring head of the coiling apparatus;

FIG. 13 is an enlarged view, taken at 13—13 FIG. 10, of the spring coil transfer head;

FIG. 14 is an enlarged view, in elevation and partly in section, showing the spring transfer assembly;

FIG. 17A is a diagrammatical illustration of the transfer head movement of the unit of FIGS. 16 and 17;

Figure 4:
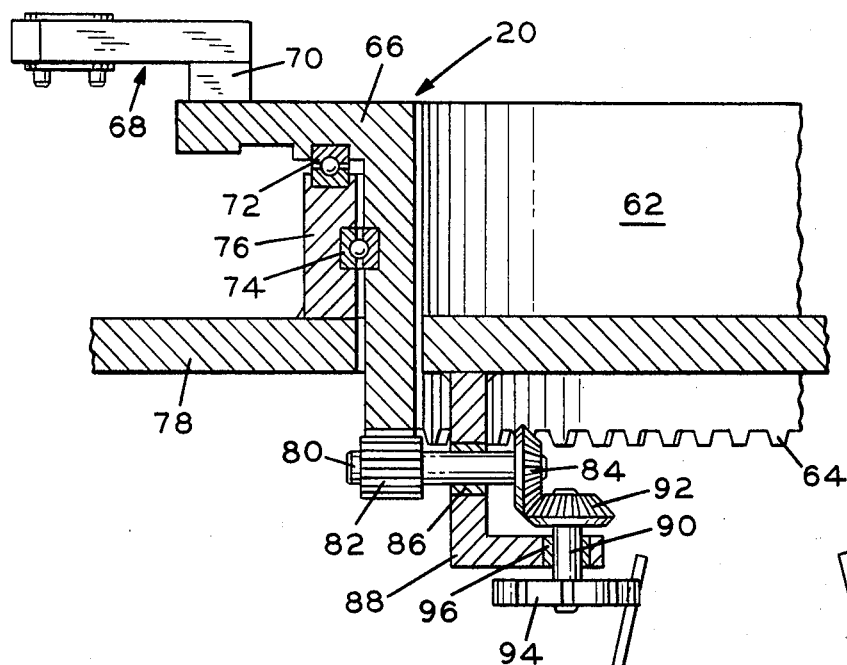
FIG. 4 is an enlarged partial view, in elevation and partly in section, taken at line 4—4 of FIG. 3, showing the main carousel drive.

Referring to the drawings, particularly FIGS. 1 and 2, the vented cover assembly to which the embodiment of the assembly apparatus of the instant invention is adapted, is made up of base 2, valve button generally designated 4 consisting of a rigid back 6 with a resilient face 8 of chemically resistant material, such a neoprene rubber, a conical compression spring 10 and a cover 12. Base 2 has an aperture 14 and raised lands 16. Cover 12 has an aperture 18. In the apparatus of the instant invention, as will be described, base 2, valve button 4, spring 10 and cover 12 are assembled and cover 12 is welded to base 2 at lands 16, compressing spring 10 therebetween. Compressed spring 10 holds valve button 4 over aperture 14, resilient face 8 of button 4 forming a gas tight seal over aperture 14.

Referring now to FIG. 3, the apparatus of the instant invention includes a carousel, generally designated 20, mounted for rotation about a vertical hub 22, in a manner to be described, through fourteen Stations, designated No. 1 through No. 14, FIG. 3. Carousel 20 is provided with fourteen identical receptacles, generally designated 24, spaced equally around carousel 20, spaced equally around carousel 20 and fixedly mounted thereon. Mounted at fixed locations around carousel 20 for operation therewith and with receptacle 24 thereon as such receptacle is rotated thereto by the clockwise rotation of carousel 20, are receptacle inspectors, generally designated 26, at Station No. 1, centrifugal-vibratory feed hopper and hopper chute, generally designated 28, 30, respectively, and pick-and-place unit 32, all situated at Station No. 2, inspector, generally designated 34, at Station No. 3, centrifugal-vibrating feed hopper, generally designated 36, and hopper chute, generally designated 38, and pick-and-place unit, generally designated 40, all at Station 4, conical-spiral winding coil spring unit, generally designated 42, and chute and pick-and-place units, generally designated 44, 46, respectively, at Station No. 6, inspector, generally designated 48, at Station No. 7, centrifugal-vibrating hopper and chute, generally designated 50, 52, respectively, feed unit, generally designated 54 and welding unit, generally designated 56, all at Station No. 10, final inspection unit, generally designated 58 at Station No. 11, and discharge unit, generally designated 60 at Station No. 12.

As best shown in FIG. 4, carousel 20 includes a downwardly extending cylindrical portion 62 terminating in gear 64 and an outwardly extending platform section 66. Each of the receptacles 24, FIGS. 3 and 4 include an arm 68, mounted, by spacer block 70, on platform 66 and projects outwardly therefrom for reasons more apparent later hereon. Carousel 20 is mounted by bearings 72,74 on support 76 for rotation thereon. Support 76 is fixed, such as by welding, to base 78. Shaft 80 provided at one of its ends with gear 82 keyed thereto and at its other end with spur gear 84, is mounted for rotation intermediate gears 82,84 by bearing 86 mounted on support 88 fixed to base 78. Shaft 90 keyed at one of its ends to spur gear 92 and keyed at its opposite end to indexing wheel 94 is rotatably mounted intermediate its ends in bearing 96 mounted in support 88. Indexer 98 is mounted on shaft 100 mounted in bearing 102 for rotation on support 104. Pulley 106 is keyed to shaft 100 and, through belt 108, pulley 110 and motor 112 mounted on support 104, drives shaft 100 and indexer 98.

Figure 5:
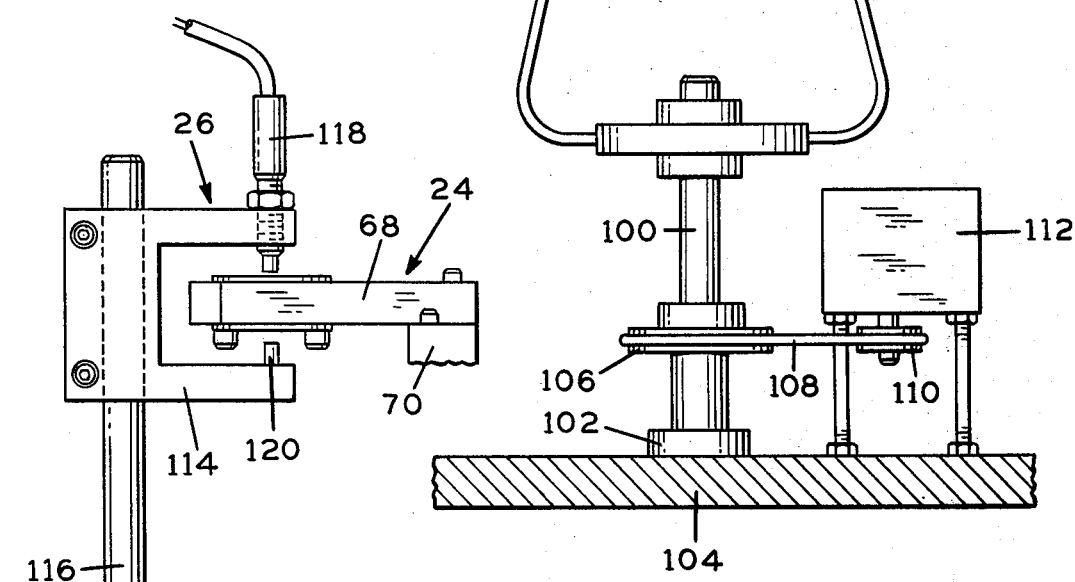
FIG. 5 is an enlarged view, in elevation, taken at 5—5 FIG. 3.

Referring, next, to FIG. 5, receptacle inspector 26 includes a "U" shaped bracket 114 mounted on stanchion 116. Photoelectric cell 118 is mounted on one leg of bracket 114, above the path of receptacle 24 and light source 120 is mounted on the other leg below the receptacle path.

As best shown in FIG. 7, pick-and-place unit 32, of conventional construction, is driven from carousel gear 64 by gear 122 keyed to shaft 124 rotatably mounted in brackets 126,128 fixed to base 78 and by spur gear 130 keyed to shaft 124 and spur gear 132 keyed to drive shaft 134 of unit 32. Arm 136 is fastened, at one of its ends, to out put shaft 138 of unit 32. Pick up head 140 is mounted on the other end of arm 136 and is mounted for vertical adjustment thereon by lock screws 142, 144.

Pick up head 140, FIG. 7A, has a recess 146 of suitable size to pick up for transfer the component part being transferred and placed by head 140. Air passages 148 connect recess 146 to a vacuum or pressure source, as the case may be, for purposes later described.

Pick-and-place unit 40 at Station No. 4 and pick-and-place unit 46 at Station No. 7, FIG. 3, but for the size of the pick up heads are substantially identical and are driven and operate in the same manner as pick-and-place unit 32. Hence, further description of such units 40 and 46 are not deemed necessary. Each of the pick-and-place units 32, 40, 46 operate through the cycle designated in full line at A, FIG. 7B to pick up, transfer and place the component and through the cycle designated in phantom line at B, FIG. 7B, to return from the placing position to the pick up position.

Referring now to FIG. 8, each of the arms 68 of the receptacles 24, is provided with a two piece assembly holder having an upper portion 150 nesting in a recess 152 in the upper surface of arm 68 and a lower portion 154 held in recess 156 in the lower surface of arm 68 by circular plate 158 open at its center 160 and fastened to the lower surface of arm 68 by screws 162. For reasons more apparent later herein, lower portion 154 of the holder is to be pushed upward in recess 156 and through the center of upper portion 150. Preferably the lower portion 154 is made from a low electrical resistance metal, at least of a resistance lower than that of the assembled unit at the time of welding. The upper surface of upper portion 150 is recessed, at 164, to receive the flange of base 2 to be assembled and the upper surface of lower portion 154 is recessed, at 166 to receive the center of base 2, all for reasons more apparent later herein.

Inspection unit 34, Station No. 3 and inspection unit 48, Station No. 7, FIG. 3, are of the same configuration and include a stanchion 170 mounted on base 78, not shown, FIG. 8, an arm 172 clamped to stanchion 170 and photocell unit 174 which, as will be later described, includes both the light source and the light responsive photocell unit.

As best shown in FIGS. 9–15, coil spring unit 42 includes a conventional spring coiling apparatus, generally designated 180, mounted on stand 182 fixed to base and coiling heads 184, 186 driven in conventional manner by drive means, not shown, for coiling and cutting wire 188 into conical, compression coiled spring units 190, FIG. 11. Spring coiling post 192, divided at its end extending toward coiling apparatus into four substantially triangular spaced projections 194, 196, 198, 200 is mounted in fixed position on arm 202 pivoted at 204 to stand 182. The projecting end of coiling post 192 extends through stripper 206 mounted in fixed position at the upper, input end of chute 208. Intermediate its ends, arm 202 is adjustably connected by stud 210 and nuts 212, 214 to the end of arm 216 also pivoted at 204 to stand 182. Through a cylinder and piston arrangement, not shown, connected to air line 218 arm 202 is pivoted about pivot 204 from the full line position, FIGS. 10, 11, to the phantom line position, withdrawing the triangular projection ends 194, 196, 198, 200 of spring coiling post 192 through stripper 206.

Figure 15:
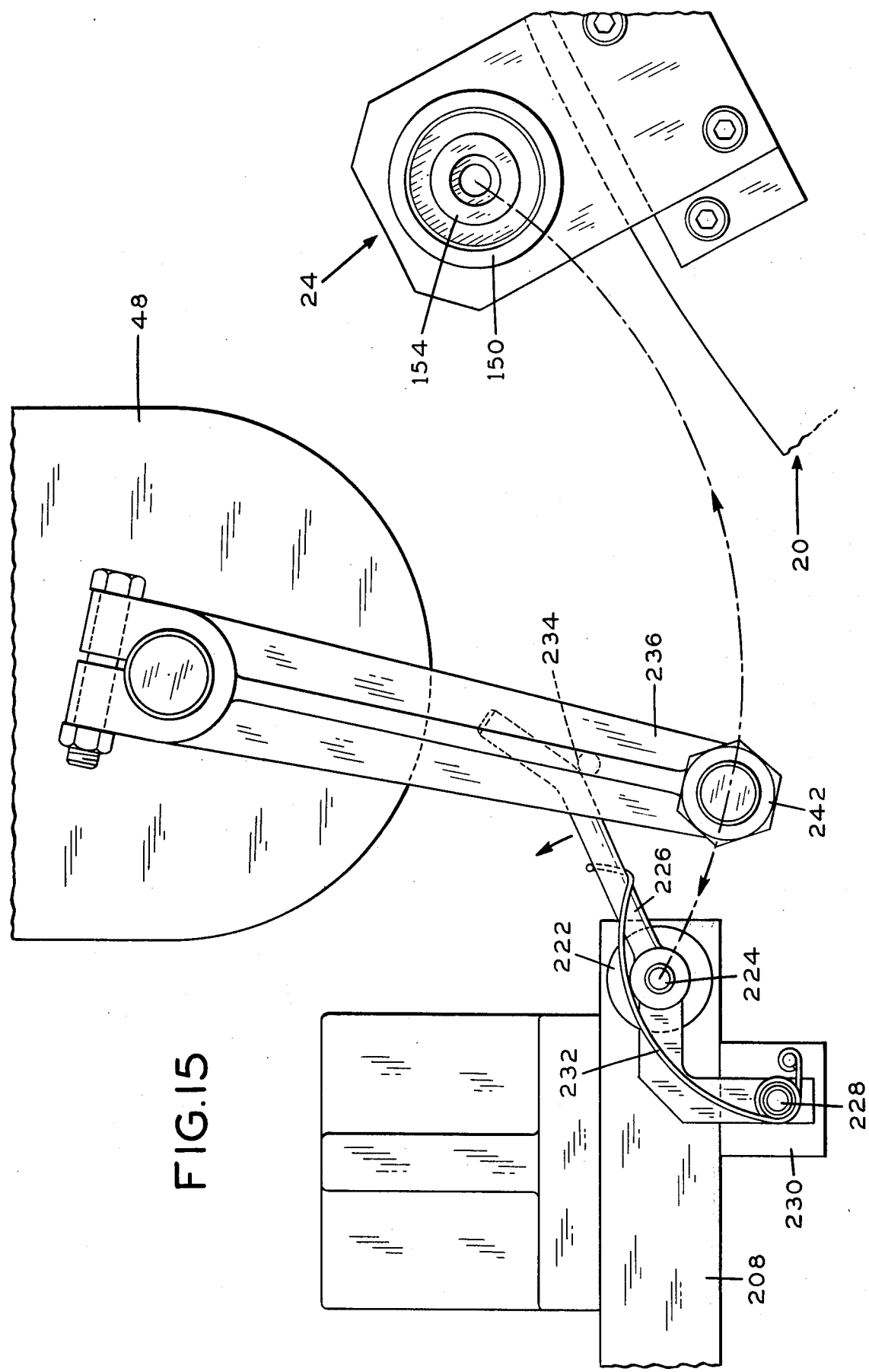
FIG. 15 is a further enlarged plan view of the apparatus of FIG. 14.

Chute 208 is mounted at its lower end on base 78 by support 220. Chute cap 222, FIGS. 14, 15, is mounted on pin 224 fixed to arm 226 intermediate the ends of the arm. Arm 226 is pivoted at pivot 228 to support 230 mounted on the side of chute 208. Chute cap 222 is urged into chute covering position by spring 232 and is swung out of covering position by pin 234 mounted on arm 236 of pick-and-place unit 48. Arm 236 is mounted on output shaft 238 of unit 48. Pick up head 240 is adjustably mounted on arm 236 and is locked in adjusted position thereon by lock nut 242. At its lower end, pick up head 240 is provided with a conical recess 244, shaped to receive conical spring 10, and an air passage 246.

Figure 16:
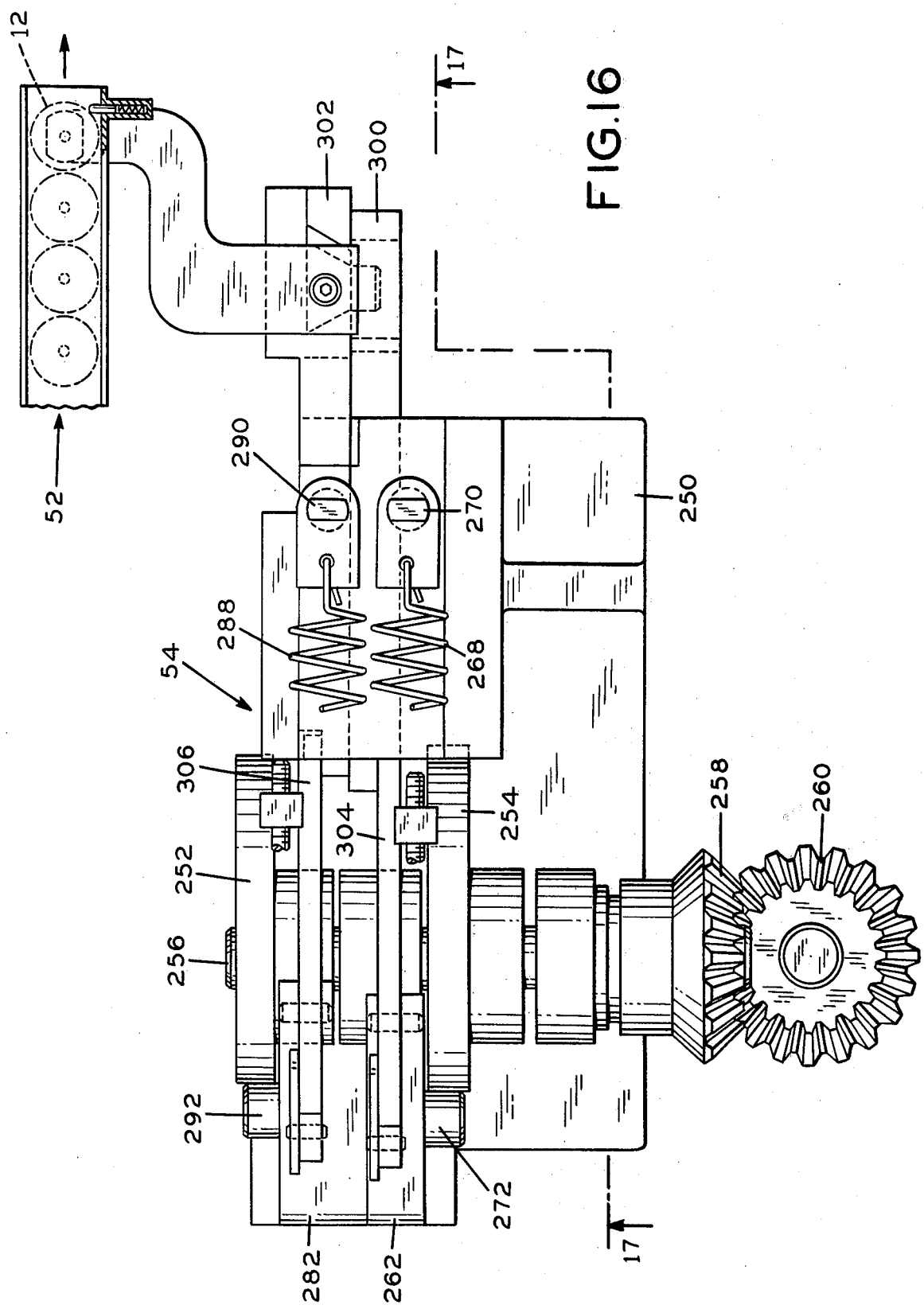
FIG. 16 is an enlarged top plan view of the cap feed and transfer apparatus of the invention.
Figure 17:
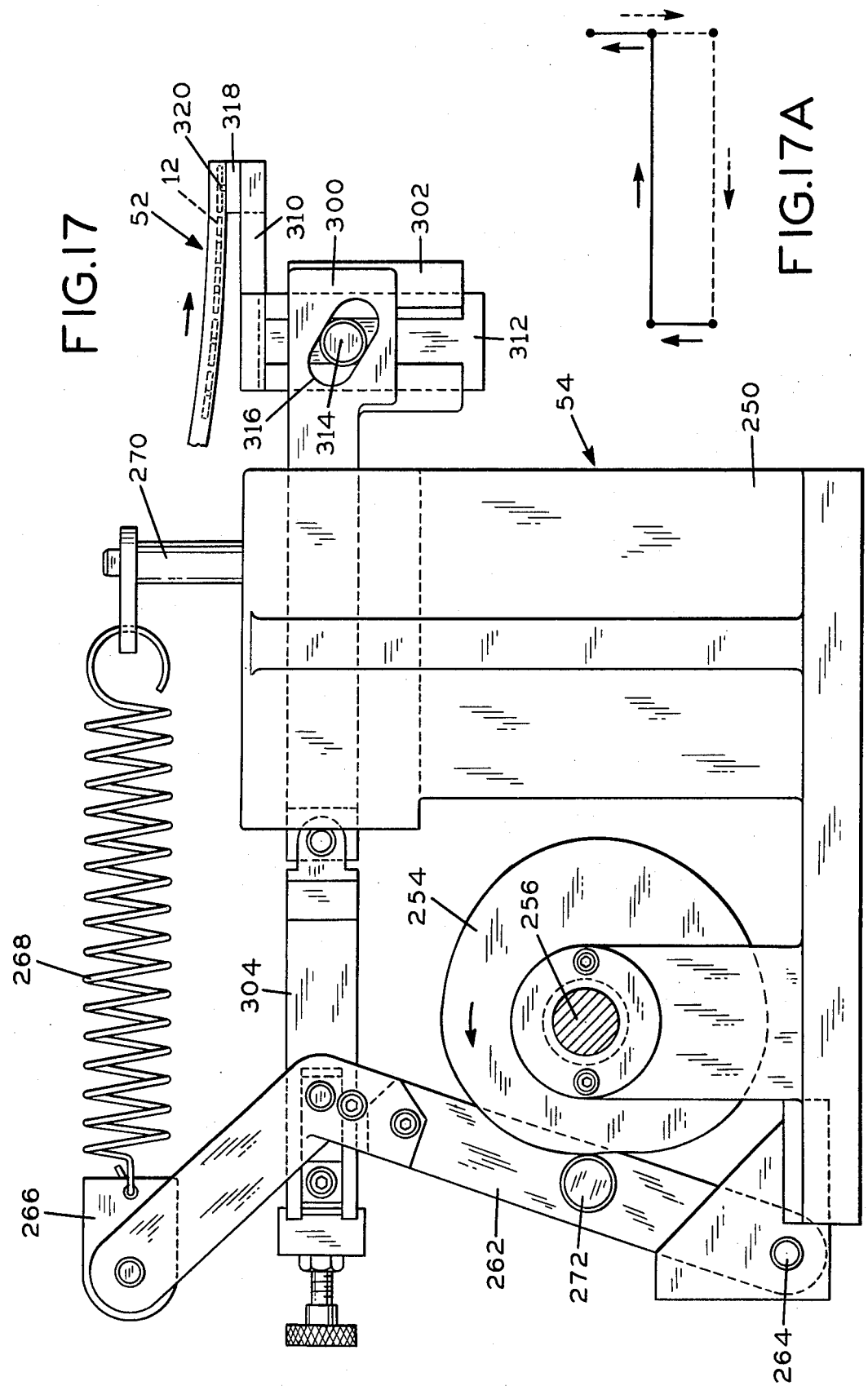
FIG. 17 is an enlarged view in elevation taken at 17—17 FIGS. 3 and 16.

Feeder unit 54, FIGS. 3, 16, 17, includes a frame 250 mounted on base 78, cams 252, 254 keyed to cam shaft 256, spur gear 258 keyed to shaft 256 and spur gear 260 in driving mesh with gear 258. For reasons more apparent later herein, spur gear 260 is driven by a gear drive, not shown, from gear 64 of carousel 20. Arm 262 is pivotally connected at one of its ends at pivot 264 to frame 250 and, at its other end at 266 is connected to one end of tension spring 268 mounted at its other end on post 270 on frame 250. Cam follower 272 is mounted on arm 262 and follows cam 254, as will be later described.

Arm 282, identical to arm 262, is pivoted at one of its ends by pivot 284 to frame 250 and, at its opposite end 286 is connected to one end of tensile spring 288 connected at its opposite end to post 292 fixed to frame 250. Cam follower 292 is mounted on arm 282 and follows cam 252 as will be described.

Parallel actuator arms 300, 302 are slidably mounted in frame 250 and are connected, respectively, at one end by links 304, 306 to arms 262, 282, respectively. Pick up 310, having downwardly extending skirt 312 is mounted for vertical sliding movement in actuator arm 302 by skirt 312. Cam follower 314 is fixed to skirt 312 and is engaged in angular cam slot 316 in arm 300 for reasons more apparent later herein. Pick up platform 318 of pick up 310 has an upwardly projecting pin 320 for purposes later described.

Figure 18:
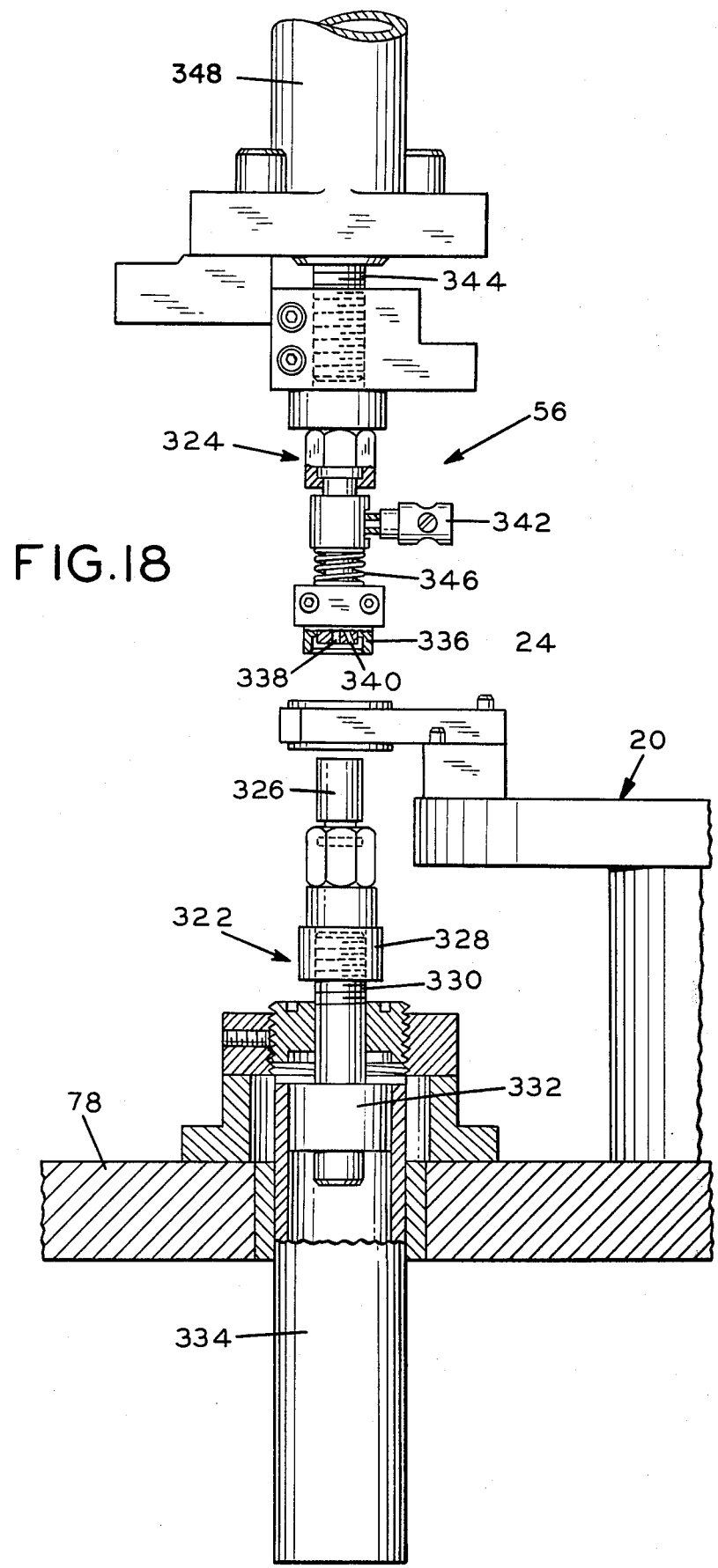
FIG. 18 is an enlarged view, in elevation and partly in section, of the welding unit of the apparatus.

Referring, next, to FIG. 18 welding unit 56 includes a lower welding portion, generally designated 322, mounted on base 78 below carousel 20 and the path of receptacle 24, and upper welding portion 324 mounted above carousel 20 and the receptacle path. Welding head 326 of lower welding portion 322 is adjustably mounted at 328 to piston rod 330 of piston 332 in air cylinder 334. For reasons more apparent later herein, during the welding operation air is introduced into cylinder 334 raising piston 332, piston rod 330 and welding head 326 to lift lower portion 154 of receptacle 24 and the cover unit assembled therein upwardly toward upper welding portion 324.

Upper welding portion 324 includes an upper welding head 336 having air passages 338, 340 connected at 342 to a vacuum and air pressure source, not shown, for purposes more apparent later herein. Upper welding head 336 is mounted on piston rod 344 by spring 346. Piston rod 344 is connected to the piston, not shown, in air cylinder 348. Heads 326, 336 are actuated by air cylinders 334, 346 respectively, and the piston rods associated therewith to engage and weld the cover unit assembly in receptacle 24 at the welding station during the operation of the apparatus, as will be later described.

Figure 19:
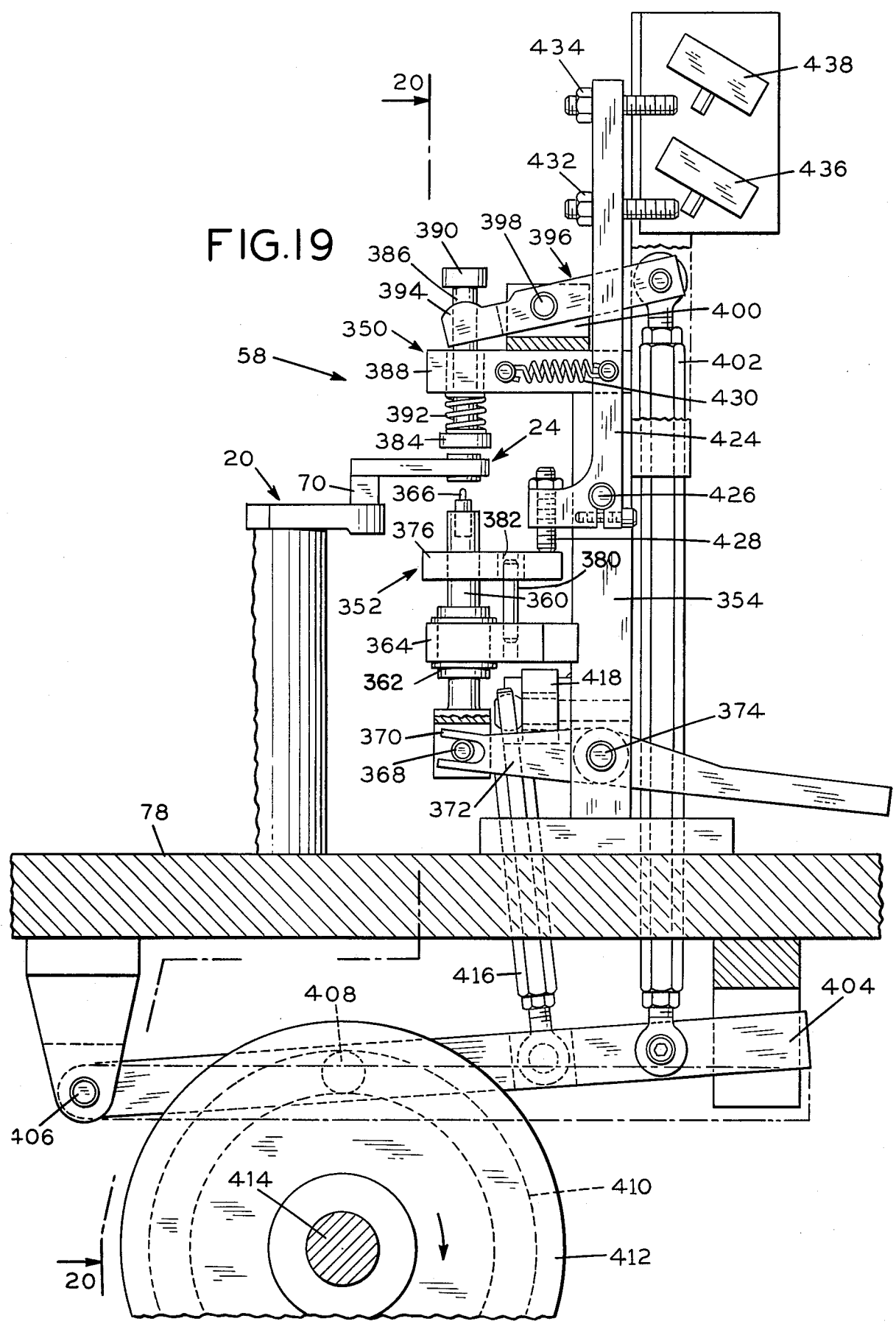
FIG. 19 is an enlarged view, in elevation and partly in section and taken at 19—19 FIG. 3, showing the final assembly inspection apparatus.
Figure 20:
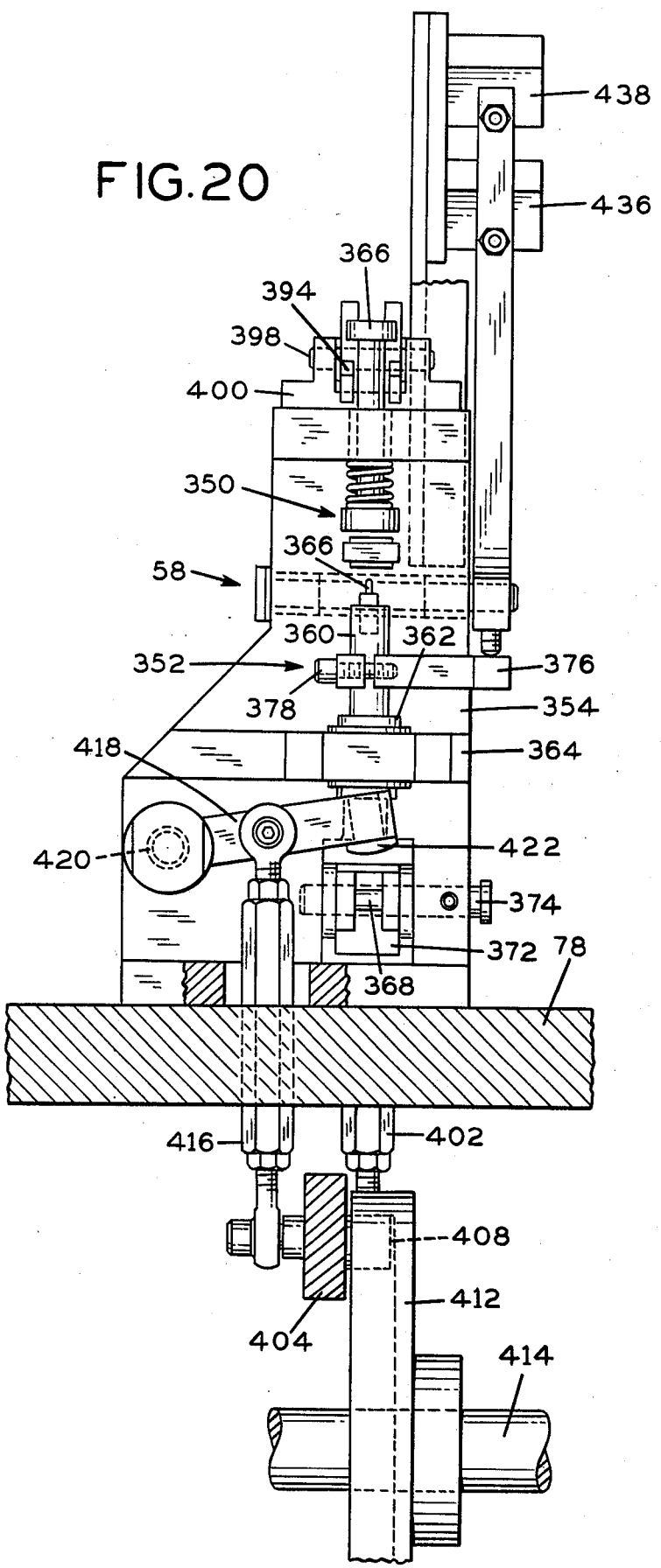
FIG. 20 is a view taken at 20—20, FIG. 19.

Referring to FIGS. 19 and 20, final inspection unit 58 is made up of upper and lower units, generally designated 350, 352, respectively, mounted on frame 354 for relative movement toward and away from receptacle 24 on carousel 20 movable through a path therebetween. Frame 354 is fixed to base 78.

Lower unit 352 includes a shaft 360 mounted for vertical movement in bearing 362 mounted in support 364 fixed to frame 354. At its upper end, shaft 360 is provided with a pin 366 for purposes more apparent later herein. At its lower end, shaft 360 is connected by pin 368 to the bifurcated end 370 of lever 372 pivotally mounted at 374 to frame 354. Collar 376 is clamped by clamping screw 378, FIG. 20, to shaft 360 intermediate the ends of the shaft. Guide pin 380 is mounted in support 364 and extends into guide opening 382 in collar 376 for guiding collar 376 and pin 360 as pin 360 and collar 376 are moved, vertically, up and down.

Upper unit 350 includes a head 384 mounted at one end of shaft 386 slidable in support 388 fixed to frame 354. At its upper end, shaft 386 is provided with a collar 390 and is urged by spring 392 between head 384 and the under surface of support 388 in a downward direction toward receptacle 24. The bifurcated end 394 of lever 396 pivoted at 398 to fixed frame member 400 engages collar 390 for lifting shaft 386 as will be later described. At its opposite end, lever 396 is connected to one end of actuator rod 402 connected, at its other end, to lever 404, pivoted at 406 to base 78 and actuated by cam follower 408 in cam track 410 of cam 412 keyed to shaft 414 and rotated by a gear, not shown, geared to gear 64 on the cylindrical portion 62 of carousel 20. Actuator rod 416 is pivoted, at one of its ends, to lever 404 and at its other end to lever 418, pivoted, at 420, to frame 354. The free end 422 of lever 418 engages lever 372 for pivoting lever 372 about pivot 374 for reasons more fully described later herein. Switch actuator 424 is pivoted at 426 to frame 354 and, at adjustable stop 428, is engaged by collar 376 and is held in engagement therewith by spring 430. Adjustable arms 432, 434 are positioned for contact with switches 436, 438, respectively, as actuator 424 is pivoted on frame 354 for purposes more fully described later herein.

Figure 22:
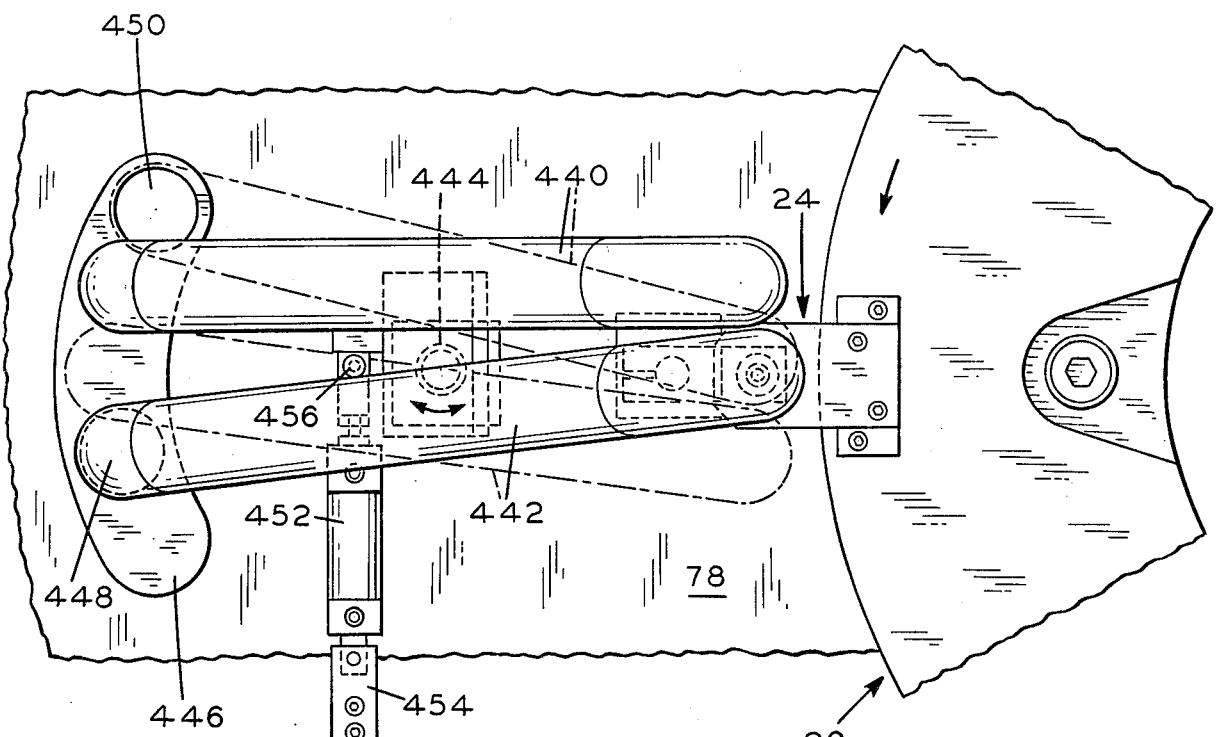
FIG. 22 is a top plan view of the apparatus of FIG. 21 showing such apparatus in full line in one of its sorting positions and, in phantom line, in its other position.
Figure 21:
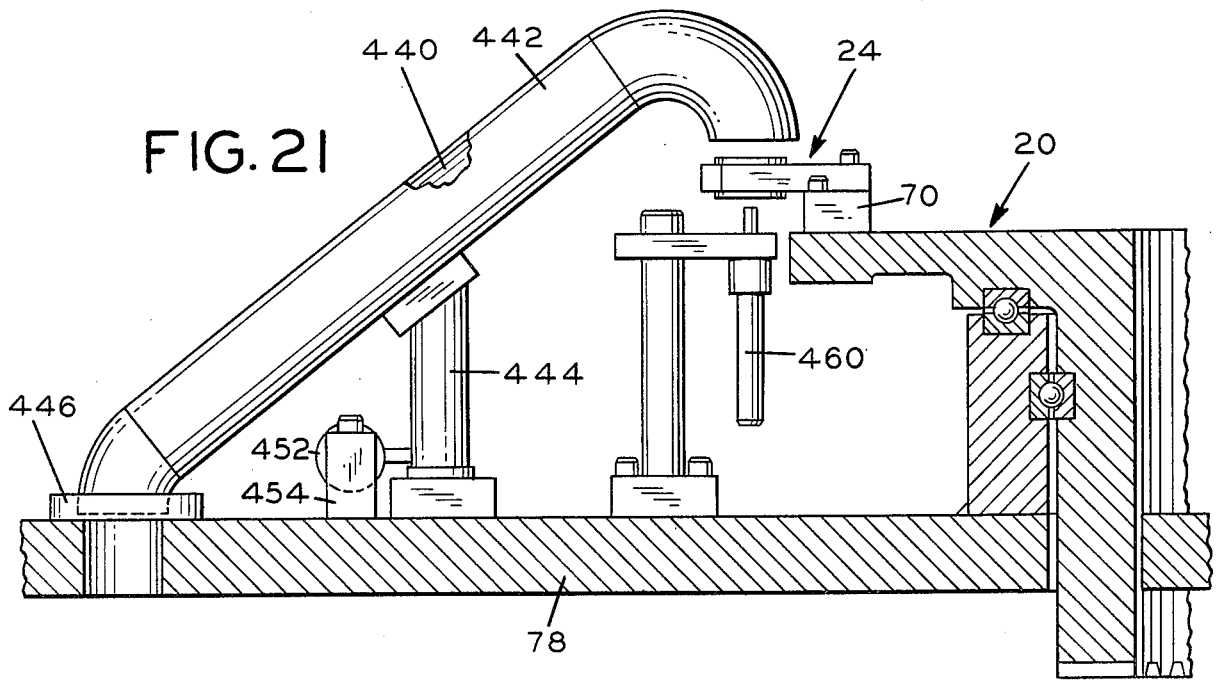
FIG. 21 is an enlarged view, in elevation and partly in section, of the final sorting apparatus.

Referring next to FIGS. 21, 22, discharge chutes 440, 442 are pivotally mounted at 444 to base 78 and are connected, at one end, to flange 446 slidable on base 78 for selective alignment of the ends of chutes 440, 442 with discharge openings 448, 450, as the case may be. For purposes later described chutes 440, 442 are selectively positioned over discharge openings 448, 450 by actuator 452 connected at 454 to base 78 and at 456 to pivot 444. An ejector 460 which may be an air actuated or solenoid actuated pin which is mounted on base 78 under the end of discharge chute 440, 442, as the case may be, at Station 12, FIG. 3, when the assembly in receptacle 24 at such Station is to be discharged.

In the operation of the apparatus of the instant invention, carousel 20 is intermittently driven between Stations and stopped at each Station. The lapsed time in drive between Stations is the same and the dwell time at each Station is the same. While the carousel is stopped or at dwell at the Station, the operation at the Station is completed before receptacle 24 at such Station is driven or moved by carousel 20 to the next Station. In the description which follows, the operation which takes place at each Station, during dwell, will be described, it being understood that, while the described operation is taking place at the one Station, other operations performed at other Stations are being simultaneously carried out.

Referring to FIG. 3, the operation of the apparatus of the instant invention will be described commencing at Station No. 1 and will be continued, sequentially, at each Station thereafter around to the last of the operation Stations which, in the apparatus which will be described, is Station No. 12. In such apparatus, while carousel 20 and receptacle 24 is stopped and dwells at each Station, at Station Nos. 5, 8, 9, 13 and 14 of the embodiment of the invention described herein, no operation is performed.

Motor 112, FIG. 4, is driven continuously and through pulleys 106, 110 and belt 108, driven shaft 100, indexer 98 indexing wheel 94, spur gear drives 82, 84, 90 and gear 64 intermittently drives carousel 20 between the various stations and, between such intermittent drive, causes receptacle 24 at each of the Station Nos. 1-14, to remain and dwell at such Station. With the apparatus operating in the manner intended, receptacle 24 advanced from Station No. 14 to Station No. 1 is empty, i.e., all of the parts placed and assembled in aperture 24 during the preceding operating cycle have been removed. As a safety precaution and to avoid damage to the apparatus should there have been a malfunction or error in the proceeding operating cycle, in the apparatus of the instant invention, aperture 24 at Station No. 1 is inspected by photocell 118 and light source 120 at Station No. 1. Thus, if light source 120 actuates photocell 118 to Station No. 1, FIG. 5, the apparatus is programmed for the receipt and assembly of cover parts at the following Stations. If, on the other hand, light from light source 120 is prevented from reaching photocell 118 because aperture 24 at Station No. 1 contains all or any part of a cover unit, the apparatus is programmed to skip such aperture 24 as it is advanced from Station through the following Station sequence.

Figure 6A:
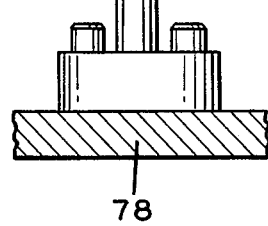
FIG. 6A is an enlarged view, in elevation and in section, taken at 6—6 FIG. 3, showing the feed of the base member when properly oriented.
Figure 6B:
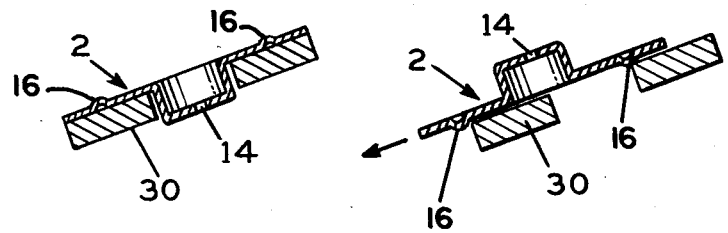
FIG. 6B is a view, similar to FIG. 6A but showing the base member inverted and being rejected.
Figure 9:
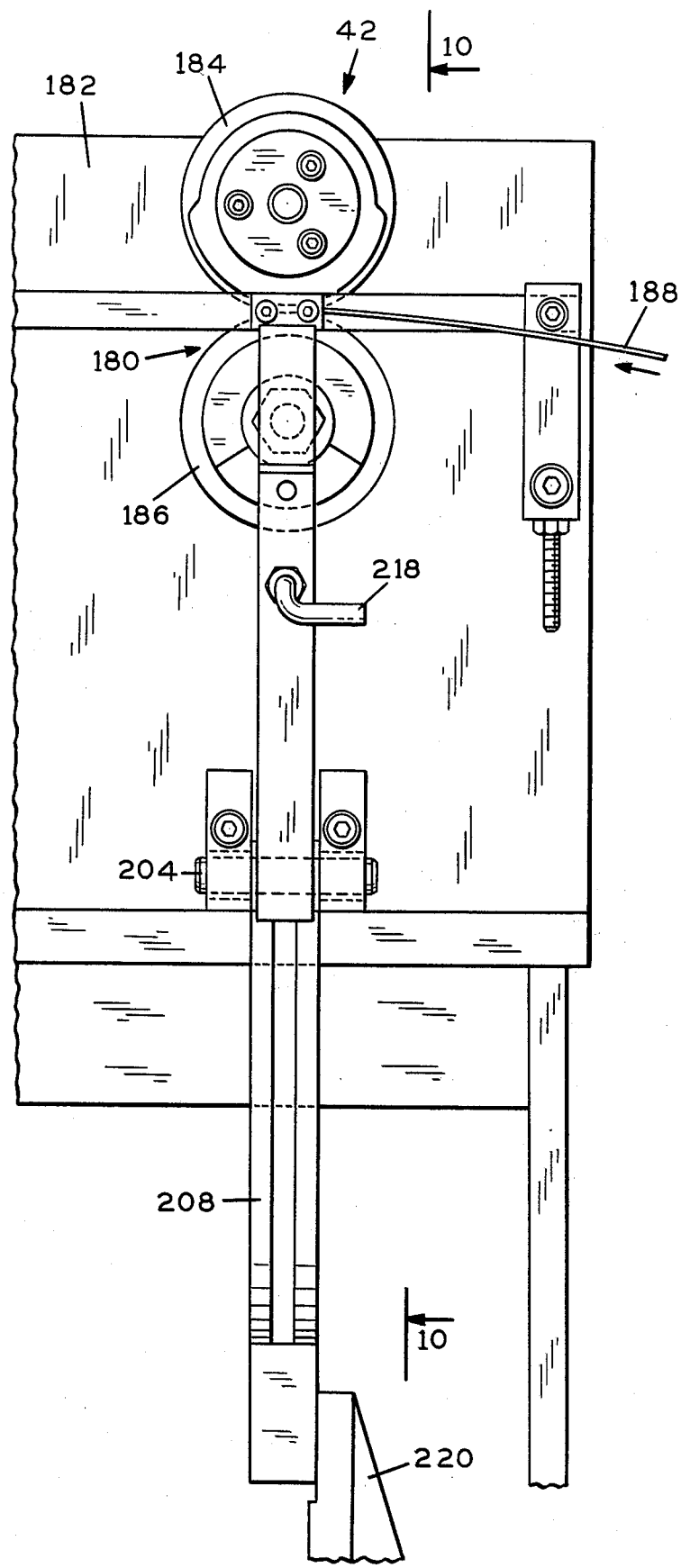
FIG. 9 is an enlarged front view, in elevation, of the conical spring coiling apparatus of the instant invention.

With aperture 24 at Station No. 1 inspected and found clear by photoelectric inspector 26, FIG. 5, at Station No. 1, receptacle 24 is advanced to Station No. 2. Prior to such advancement of receptacle 24 from Station No. 1 to Station No. 2, the hopper of centrifugal-vibratory feed hopper 28 has been filled with loose base members 2, FIGS. 1 and 2 and, in such hopper have been advanced, one after the other, around the hopper bowl, up the hopper track and to chute 38. As best shown in FIGS. 6A and 6B, just before the entry of such bases from the track in vibratory hopper 28 to the feed end of chute 30, the hopper track is sloped and bifurcated. The bases which are in the proper orientation, i.e., with the recessed portion down, fall into the bifurcation in the track, are vibratorily advanced along the track and pass into chute 30. On the other hand, the bases 2 which have the recessed side facing upwardly, i.e., are upside down, slide off of the track and back into the hopper of the vibratory feed. Thus, all of the bases which pass into chute 30 are oriented with the recessed side downward. Hopper 28 may be operated continuously or, preferably, is operated intermittently, that is, is automatically turned off when the length of the chute from the discharge end to the hopper end is full or contains a specified number of bases. Such intermittent operation avoids wear and damage to the bases vibrating in hopper 28.

Bases 2 are fed, one after the other, down chute 30. Thus, at the carousel end of chute 30 bases 2 may be picked up, one after the other, and positioned in receptacle 24 at Station No. 2. Pick and place unit 32, FIGS. 3 and 7, is driven from gear 64, FIG. 7. Thus, as the carousel is driven by motor 112, advancing receptacle 24 from Station No. 1 to Station No. 2, pick head 140 of unit 132 is lowered into the end of chute 30, through vacuum in air passage 148, pick up base member 2 from chute 30 into recess 146, swings arm 136 and pick up head 140 through an arcuate path, as shown in solid line in FIG. 7B and, as the receptacle 24 reaches Station No. 2 lowers head 140 and base 2 into the receptacle cavity. The vacuum in air passage 148 is then released and, preferably, is replaced with air under slight pressure to blow base 2 from recess 146 of head 140 into the aligned cavity of receptacle 24. During the initial portion of the movement of the receptacle from Station No. 1 to Station No. 2, head 140 is lifted and arm 136 is swung counter-clockwise through the arcuate path shown in phantom line, FIG. 7B and, thereafter, is lowered into the end of chute 30, picks up base member 2 and swings arm 136 in the clockwise direction, as shown in full line, FIG. 7B and as hereinabove described.

With base 2 in receptacle 24, the receptacle is indexed by motor 112 to Station No. 3. At Station No. 3, receptacle 24, with base 2 therein, is inspected. With the base 3 in the cavity of receptacle 24 at Station No. 3, the light rays from unit 174, FIGS. 3, 8, is reflected back into the cell indicating that the first step in the assembly has been completed as intended. If, on the other hand, unit 174 finds the cavity of receptacle 24 to be empty, i.e., the apparatus has malfunctioned and receptacle 20 does not contain a base 2, the light rays are not reflected and inspector unit 34 at Station No. 3 programs all of the Stations thereafter to pass such receptacle as it reaches and dwells at each following Station. This is accomplished at the following Stations by setting air valves, when such receptacle reaches such Stations, on pressure, rather than vacuum, so that the unit which otherwise would be picked up and placed in the receptacle at such Station remains in the feed chute. Thus, assembly in such receptacle is is not completed and the incomplete unit in such receptacle is rejected at the final Station.

At the same time that feed hopper 28 is filled with base members 2, a supply of loose valve buttons 4 are supplied to the hopper of centrifugal-vibrating feed hopper 36. By the vibration and feed of such hopper, the buttons are vibrated and fed, one after the other, up and along the feed ramp around the hopper bowl. Some of the valve buttons 4 so fed reach the feed end of button chute 38 with the rigid back 6 facing up while others reach such chute with the resilient face 8 facing up. Because, in the assembly, the resilient face 8 is to face down and act as a valve and cover over aperture 14, FIGS. 1 and 2, just before entering chute 38 buttons 4 pass under a photocell. If resilient face 8 is facing up, i.e., button 4 is upside down, light otherwise reflected to the photocell is broken by the resilient, non-reflective face of button 4, an air valve is actuated and an air blast, in the direction of the arrow, FIG. 3, is directed at such upside down button and such button is ejected from the feed path back into the hopper bowl rather than being fed into chute 38. Thus, all of the buttons feed into and by chute 38 to the pick up head of pick-and-place unit 40 are oriented, before entering chute 38, so that the resilient side 8 is facing downwardly.

As receptacle 24 is advanced from Station No. 3 to Station No. 4, the pick up head of pick and place unit 40 is rotated into place over the end of chute 38, the pick up head is lowered into the end of chute 38 and, by vacuum applied to the pick up head, picks up the button 4 at the end of such chute, the pick up head is elevated out of the chute end and, with button 4 held by vacuum in the head, the arm of pick-and-place unit 40 is swung counterclockwise so that, as receptacle 24 reaches Station No. 4 and stops, the pick up head is lowered into the receptacle, button 4 is positioned in the recess of base 2 in receptacle 24, the vacuum is released and, preferably, replaced with air, and button 4 is released and deposited in the base 2 recess.

With button 4 in the recess of base 2, receptacle 24 is advanced to Station No. 5 and, after the standard dwell therein, is advanced to Station No. 6. As already noted, there is no operation performed at Station No. 5.

At Station No. 6, spring 10, wound and formed in the coil spring unit 42 is picked up from the end of chute 44 and placed over button 4 in receptacle 24 by pick-and-place unit 46.

As best shown in FIGS. 9-12, spring wire 188 is fed to coiling heads 184, 186 and is coiled onto coiling post 192 into the conical spring unit 10. The coiled spring 10 is stripped off at post 192 and the resilient triangular projections 194, 196, 198, 200 thereof by retracting arms 202, 216 from the full line to the phantom line position, FIGS. 10 and 11, feeding the conically coiled spring unit 10 stripped from the end of post 192 into the upper end of spring chute 208. Thus conically coiled springs 10 are fed, one after the other, from the top of spring chute 208 to the bottom or discharge end of the chute.

As carousel 20 is advancing receptacle 24 from Station No. 5 to Station No. 6, arm 236 of pick-and-place unit 46 is rotated clockwise from its prior position where it had discharged coil spring 10 into the preceding receptacle to position over the end of spring chute 208, picks up a coil spring 10 from the end of chute 208, rotates counter-clockwise and deposits the coil spring into receptacle 24 as such receptacle reaches Station No. 6.

As arm 236 moves clockwise toward spring chute 208, pin 234, FIG. 15, contacts arm 226 of chute cap 222, swings 226 counter-clockwise around pivot 228, uncovers the end of chute 208 and pick up head 240 of arm 236 is advanced by pick-and-place unit 48 downwardly into the end of chute 208 to pick up coil spring unit 10 therein. As best shown in FIG. 13, the end of pick up head 240 has a conical recess 244 which engages the spring and, with vacuum applied at air passage 246, picks up and holds conical spring 10 as pick up head 240 of pick-and-place unit 48 is elevated and then rotated counter-clockwise toward Station No. 6. As head 236 is rotated counter-clockwise, cover arm 226 is held in engagement with pin 234 by spring 232, re-covering the end of chute 208 as pin 234 on arm 236 releases arm 226 and arm 236 and pick up head 240 move to Station No. 6.

The counter-clockwise movement of arm 236 and pick up head 240, uncovering of the end of spring chute 208, pick up of spring 10, counter-clockwise movement of arm 236 and pick up head 240, positioning of pick up head 240 over Station No. 6 and the advancement of arm 236 and pick up head 240 downwardly to place the coiled spring 10, held by vacuum in pick up head 240, on the button 10 in the receptacle 24 advanced from Station No. 5 to Station No. 6 all occurs during the advancement of receptacle 24 from Station No. 5 to Station No. 6. With arm 236 and pick up head 240 advanced downwardly into receptacle 24, the vacuum in air passage 246 is interrupted and, preferably, replaced with air under pressure and the coil spring 10 is discharged from pick up head 240 onto button 40 in the recess of base 2 in receptacle 24.

As carousel 20 advances receptacle 24 from Station No. 6 to Station No. 7, pick up head 240 and arm 236 are elevated, rotated counter-clockwise and repeat the spring pick up operation, hereinabove described, for the next receptacle moving from Station No. 5 to Station No. 6.

When receptacle 24 reaches Station No. 7, carousel 20 stops and the dwell interval is repeated. At Station No. 7, the inspection operation performed by inspection unit 34 at Station No. 3 and described above is repeated by inspection unit 48. At this inspection, however, the photocell and the light source are positioned so as to determine whether receptacle 24 contains base 2, button 4 and spring 10. When all three elements are present, the passage of light from light source 120 to photocell 118 is broken and the following Stations and units are programmed to complete the assembly. If, on the other hand, base 2, button 4 or spring 10 is missing from the assembly at Station No. 7, the following Stations and units are programmed so as to pass the incomplete unit.

Carousel 20 advances receptacle 24 to Station No. 8, then to Station No. 9 and to Station No. 10. At Station Nos. 8 and 9, as already noted, in the embodiment of the invention described there are no operations performed.

At the time the hoppers of vibratory feeds 28 and 36 are filled or before the assembly operation commenses, the hopper of centrifugal-vibratory hopper 50 at Station No. 10 is filled with cover members 12 and, by the vibration and feed of vibratory hopper unit 50, are advanced, one after the other, around the hopper bowl, up the hopper track and into chute 52, FIGS. 16, 17. As carousel 20 advances receptacle 24 from Station No. 9 to Station No. 10, spur gear 260, driven from gear 64 of carousel 20, drives spur gear 258 and shaft 252 to rotate cams 252, 254. As cams 252, 254 rotate and during the initial movement of carousel 20 and movement of receptacle 24 from Station No. 9 to Station No. 10, pick up platform 318, FIG. 17, is advanced upwardly along the solid line and in the direction of the arrows, FIG. 17A, and picks up cover 12 at the end of feed chute 52. Pin 320 on platform 318 engages aperture 18 in cover 12, sliding cover 12 out of the end of chute 52 and moving cover 12 with pick up platform 318. The platform is advanced from left to right in the direction of the arrow and along the full line in FIG. 17A until cover 12 and platform 318 are under upper welding head 336, FIG. 18, Station No. 10, FIG. 3. With cover 12 and platform 318 under welding head 336, cams 252, 254 and the relative movement of actuator arms 300, 302 relative to each other causes camming follower 314 to be elevated, upwardly, in cam slot 316 and lifts platform 318 and cover 12 thereon into the recess in upper welding head 336. Vacuum is then applied to air passages 338, 340 in welding head 336 causing the welding head to pick up cover 12 off of platform 318 and to hold such cover in the recess in head 336.

As the movement of aperture 24 from Station No. 9 to Station No. 10 continues, platform 318 is lowered, leaving cover 12 in welding head 336 and the platform is withdrawn from right to left along the phantom line and in the direction of the arrows, FIG. 17A to its original position.

With aperture 24 having base 2, button 4 and conical spring 10 therein at Station No. 10 and with cover 12 in welding head 336, air is introduced into cylinders 334, 346 advancing lower welding head 326 and upper welding head 336 toward aperture 24 and the assembly therein. As lower welding head 326 approaches aperture 24, the upper surface of welding head 326 engages lower portion 154 in aperture 24, FIG. 8, and lifts base 2, button 4 and conical spring 10 therein upwardly, bringing aperture 16 on base 2 into contact with cover 12 in upper welding head 336. The welding heads are then energized, butt welding cover 12 to base 2 through aperture 16 with button 4 and conical spring 10 between the inner surfaces of the recess in base 2 and cover 12. With the assembly butt welded, air cylinders 334, 346 are actuated to withdraw welding heads 326, 336, leaving the assembled and welded unit in aperture 24.

After the assembled unit at aperture 24 at Station No. 10, FIG. 3, has been welded and welding heads 326, 336 have been withdrawn, carousel 20 advances aperture 24 to Station No. 11. As carousel 12 advances aperture 24 from Station No. 10 to Station No. 11, cam 412 on shaft 414 is rotated by a spur gear, not shown, from gear 64 on carousel 20. Cam track 410 on cam 412 raises cam follower 408 and lever 404, raising shaft 360 and advancing pin 366 toward aperture 24. If the assembly in aperture 24 is complete, i.e., contains base 2, button 4, conical spring 10 and cover 12 and has been properly welded at Station No. 10, switch 436 on the inspection unit, FIG. 19, energizes the actuator 452 to set the discharge chutes 440, 442 to accept and discharge the assembled unit into a drum for receiving properly assembled units. If, on the other hand, the unit at Station No. 11 is incomplete or not welded, switch 438 is actuated, energizing actuator 452 to reset discharge chutes 440, 442 to accept and discharge the misassembled unit and parts thereof into a rework or scrap container.

After the inspection at Station No. 11 and with the discharge chutes 440, 442 set by inspection unit 58, carousel 20 advances receptacle 24 to Station No. 12 where ejector 460 is actuated, lifting the unit or the misassembled parts thereof out of aperture 24 and into discharge chute 440, 442, as the case may be. With the unit removed from the aperture at Station No. 12, carousel 20 advances aperture 12 to Station No. 13 and then to Station No. 14. At Station No. 13 and Station No. 14 no operations are performed, as has already been noted above. Aperture 24, when it leaves Station No. 12 and is advanced to Stations 13 and 14, and then to Station No. 1, is or should be empty. When aperture 24 reaches Station No. 1, the operation heretofore described is repeated, each operation being repeated as the aperture reaches and is stopped or dwells at each Station. Again, it is noted, while one operation is being performed at one Station, the other operations are simultaneously being performed in the other Stations around the carousel. The cover assembly and welding is carried on in the apparatus of the instant invention automatically and, with all operating units performing, an assembled and welded cover is discharged as each aperture 24 passes through Station No. 12.

The terms and expressions which has been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. An apparatus for assembling and welding into a composite unit the component parts of a vented cover for electrochemical cells, said apparatus including a carousel, receptacles fixed on said carousel, and stations around said carousel; means at respective ones of said stations for feeding to said receptacles the component parts of a cover to be assembled, one of said stations including means for forming a spring coil from wire fed to said station; said coil forming means comprising;

a coiling post;

means for retracting said coiling post upon the conclusion of a winding of a spring coil;

a chute disposed beneath said post and extending upwardly toward the site of said spring coil for contacting a base of said coil upon a retracting of said post, said coil dropping into said chute upon said retraction of said post;

said chute being curved for reorienting said coil from a horizontal orientation to a vertical orientation upon a feeding of said coil to said receptacle; and wherein said apparatus further comprises a vacuum operated nozzle having an interior surface configured for mating with said spring coil, said coil being lifted from a receptacle and depositioned within a cover member by activation and release of vacuum; and means at a following station for welding the assembled component cover parts.

2. An apparatus, as recited in claim 1, in which said feeding means further includes a component-part chute and vibrating-centrifugal hopper means for sorting and feeding component parts, one after the other, to said component-part chute.

3. An apparatus, as recited in claim 1, in which said welding station includes welding heads and means for advancing said welding heads into engagement with the assembled component cover parts in the receptacle at said welding station and for retracting said heads from said receptacle after said parts are welded.

4. An apparatus, as recited in claim 1, in which said coil forming means includes a stripper for stripping the formed coil from said post.

5. An apparatus, as recited in claim 4, in which said welding station includes welding heads and means for advancing said welding heads into engagement with the assembled component cover parts in the receptacle at said welding station and for retracting said heads from said receptacle after said parts are welded.

* * * * *